Patented Jan. 23, 1923.

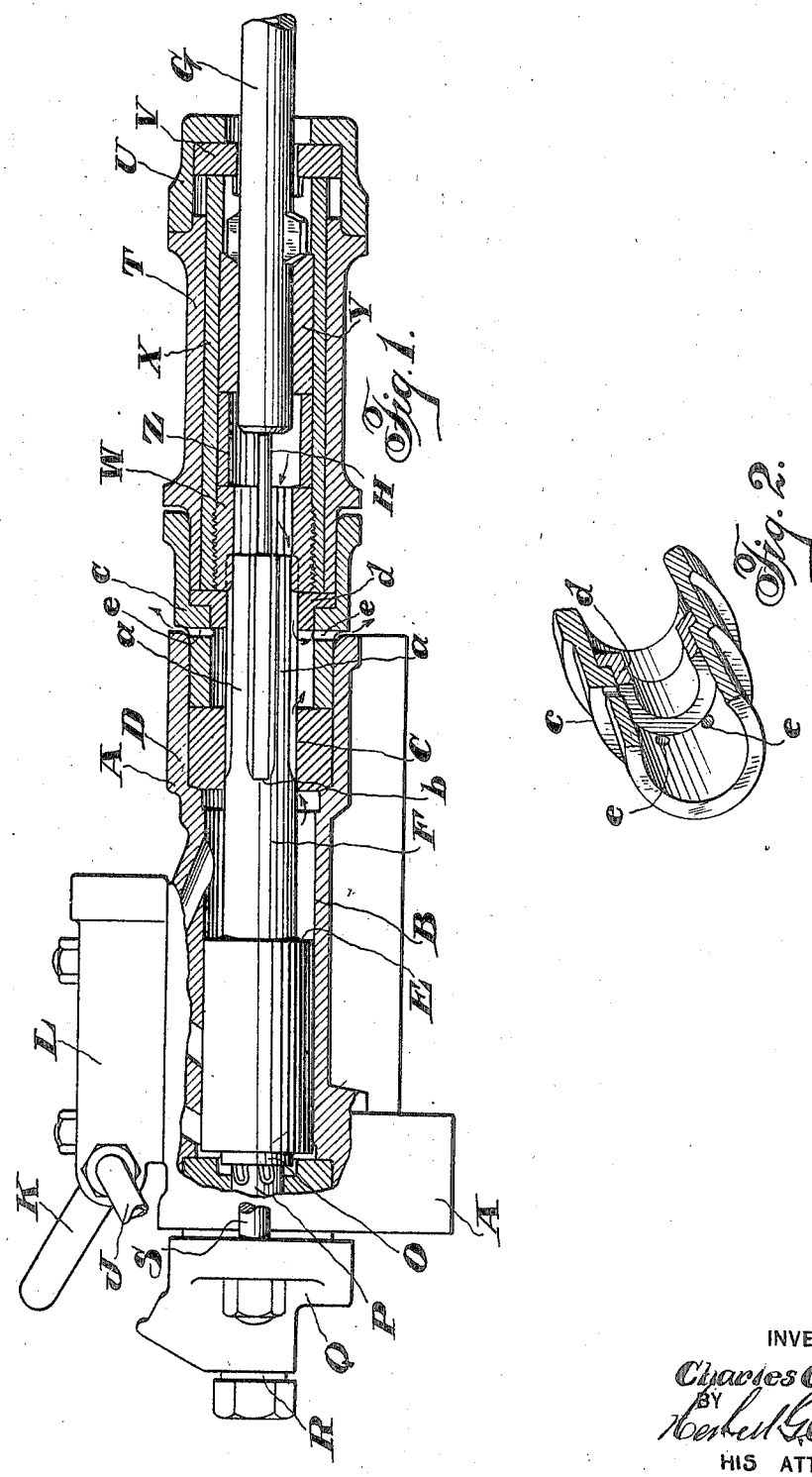

1,443,128

UNITED STATES PATENT OFFICE.

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY.

ROCK DRILL.

Application filed December 29, 1921. Serial No. 525,711.

*To all whom it may concern:*

Be it known that I, CHARLES C. HANSEN, a citizen of the United States, and a resident of Easton, county of Northampton, and State of Pennsylvania, have invented a certain Rock Drill, of which the following is a specification accompanied by drawings.

This invention relates to a fluid actuated rock drill of the hammer type and its objects are to make a machine in which the motive fluid is prevented from entering the hollow drill steel along with the water used for cleansing the holes in the rock, thus preventing fogging and the creation of fine dust in the atmosphere. A further object is to change present existing machines of the hammer type so as to prevent the delivery of motive fluid to the drill steel along with the cleansing water.

To these ends the invention is shown in the accompanying drawings, in which—

Figure 1 is a longitudinal sectional elevation of a rock drill of the type known as the "Leyner."

Figure 2 is a perspective view in longitudinal section of a cylinder extension piece used for changing the standard Leyner machine in accordance with this invention.

Referring to the drawings, the cylinder A is provided with a main bore B and a forward bore C of smaller diameter, which latter bore may be formed by a cylinder front washer D either separate from or integral with the cylinder. A piston E is adapted to reciprocate in the cylinder and is provided with a forward extension F fitting the bore C of smaller diameter. A hollow drill steel G is carried in the usual manner by the forward end of the machine, and extends into the machine to a position to receive the impact of the blows of the piston. A water tube H extends longitudinally through and approximately fits a hole in the piston, and is adapted to deliver water to the drill steel.

Motive fluid is supplied to the machine through the inlet J controlled by a suitable throttle of which the controlling handle K only is indicated. A suitable fluid distributing valve may be provided in the valve chest L, but as the distribution of motive fluid to the cylinder forms no part of the present invention, the details of such construction are not indicated. The piston is provided with a rifle bar nut O cooperating with the rifle bar P and the usual back head is indicated at Q, having the water connection R. The parts of the machine are held together by the usual side bolts S, a portion of one side bolt only being shown.

Any suitable and usual front head construction for the machine may be provided, and in this instance the front head T is provided with the front head cap U in which is located the chuck key V. A chuck nut W is threaded to the chuck X and within the chuck are located the chuck front bushing Y and the chuck back bushing Z.

So far described, the machine is like a standard "Leyner" drill, but in accordance with my invention, the piston extension F is made somewhat longer and the flutes $a$ on the forward extension, which extend rearwardly from the forward end, terminate at a point $b$ on the extension forward of that portion of the extension entering the main bore B of the cylinder, when the piston is in its rearmost position, substantially as indicated in Figure 1. By means of such construction, communication between the main bore B and the smaller bore C of the cylinder is substantially sealed at all times, because the flutes $a$ do not enter the main bore even when the piston is in its rearmost position.

In order to accommodate the standard "Leyner" construction to the new construction and change the "Leyner" drill in accordance with my invention, I provide a cylinder extension piece $c$ adapted to be interposed between the cylinder A and the front head T. This cylinder extension piece is shown in detail perspective view in Figure 2, partly in section, and a portion $d$ of said extension piece forms a guide for the forward extension of the piston. In the drawings, the guide portion $b$ is shown separate from the cylinder extension $c$, in the form of an extension washer so that it is renewable if desired, and in either case, whether separate or integral, forms a bearing and guide.

A vent to atmosphere is located at a point forward of the seal between the main and reduced bores of the cylinder for permitting the escape of any motive fluid passing the said seal around the piston extension F or passing around the water tube H through the longitudinal hole in the piston. For this purpose, one or more apertures $e$ forming vents are conveniently provided in the cylinder extension piece c so that any motive fluid leaking from the main cylinder bore B and tending to enter the drill steel G is permitted to escape to atmosphere. The vent or vents e also prevent the accumulation of pressure in the space surrounding the extreme shank end of the drill steel G, due to the leakage of motive fluid into the said space.

The attached drawings show the invention applied to a present standard machine, the only alteration being the use of a piston having a longer forward extension and the addition of an extension piece between the cylinder and the front head, it is, however, obvious that in a new machine the extension piece may be made as part of either the cylinder or the front head.

I claim:

1. In a fluid actuated rock drill, the combination of a cylinder having a main bore and a forward bore of smaller diameter, a piston reciprocating in said cylinder and having a forward extension fitting said bore of smaller diameter, flutes on the said forward extension extending rearwardly from the forward end and terminating at a point on the extension forward of that portion of the extension entering the main bore of the cylinder when the piston is in its rearmost position, whereby communication between the main bore and the smaller forward bore of the cylinder is substantially sealed to prevent motive fluid from blowing through the flutes into the front head parts of the machine, and a vent to atmosphere located at a point forward of the said seal for permitting the escape of any motive fluid passing the seal around the piston extension.

2. In a fluid actuated rock drill, the combination of a cylinder having a main bore and a forward bore of smaller diameter, a piston reciprocating in said cylinder and having a forward extension fitting said bore of smaller diameter, a cleansing fluid tube extending through and approximately fitting a hole in the piston, and adapted to deliver water to the drill steel, flutes on the said forward extension extending rearwardly from the forward end and terminating at a point on the extension forward of that portion of the extension entering the main bore of the cylinder when the piston is in its rearmost position, whereby communication between the main bore and the smaller bore of the cylinder is substantially sealed, and a vent to atmosphere located at a point forward of the said seal for permitting the escape of any motive fluid passing the seal around the piston extension or passing around the water tube through the hole in the piston.

In testimony whereof I have signed this specification.

CHARLES C. HANSEN.